United States Patent
Andrejco et al.

(10) Patent No.: US 7,116,472 B2
(45) Date of Patent: Oct. 3, 2006

(54) RARE-EARTH-DOPED OPTICAL FIBER HAVING CORE CO-DOPED WITH FLUORINE

(75) Inventors: Matthew Julius Andrejco, Clinton, NJ (US); Baishi Wang, Princeton, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 11/061,983

(22) Filed: Feb. 18, 2005

(65) Prior Publication Data

US 2006/0187540 A1 Aug. 24, 2006

(51) Int. Cl.
*H01S 3/067* (2006.01)
*H01S 3/17* (2006.01)

(52) U.S. Cl. .................. 359/341.5; 359/341.1
(58) Field of Classification Search ............. 359/341.5, 359/341.1
See application file for complete search history.

(56) References Cited

U.S. PATENT DOCUMENTS

| | | | |
|---|---|---|---|
| 4,962,067 A | 10/1990 | Myers | 501/45 |
| 5,005,175 A | 4/1991 | Desurvire et al. | 372/6 |
| 5,027,079 A | 6/1991 | Desurvire et al. | 330/4.3 |
| 5,225,925 A | 7/1993 | Grubb et al. | 359/341 |
| 5,563,732 A | 10/1996 | Erdogan et al. | 359/341 |
| 5,633,964 A * | 5/1997 | DiGiovanni et al. | 385/27 |
| 6,560,009 B1 * | 5/2003 | Andrejco et al. | 359/343 |
| 6,577,440 B1 * | 6/2003 | Endo et al. | 359/341.5 |
| 6,724,972 B1 * | 4/2004 | Anderson et al. | 385/142 |
| 6,757,474 B1 * | 6/2004 | Anderson et al. | 385/142 |
| 6,771,415 B1 * | 8/2004 | Endo et al. | 359/341.5 |

OTHER PUBLICATIONS

P. F. Wysocki, *Erbium-Doped Fiber Amplifiers: Advanced Topics*, Ch. 11, pp. 583-680, im "Rare-Earth-Doped Fiber Lasers and Amplifiers," Marcel Dekker, Inc., New York, ed. M. J. F. Digonnet (2001).

B. Wang et al., *Novel Erbium Doped Fiber for High Power Applications*, Abstract, Asia-Pacific Optical Conference, Beijing China (Nov. 2004).

* cited by examiner

*Primary Examiner*—Mark Hellner
(74) *Attorney, Agent, or Firm*—Michael J. Urbano

(57) ABSTRACT

A rare-earth-doped optical fiber comprises a silica core region doped with a rare earth element and a cladding region adjacent the core region, characterized in that the core region is also doped with aluminum (Al) and fluorine (F). The presence of small amounts of F are effective to lower the refractive index, and hence the NA, of the core region even in the presence of significant amounts of Al (e.g., >8 mol %). Thus, the fiber has both a relatively flat gain spectrum and a low NA (e.g., <0.20). Also described are optical amplifiers that incorporate such fibers. Preferably the rare earth composition of the core includes at least erbium, and the core is also doped with germanium.

5 Claims, 3 Drawing Sheets

RARE-EARTH-DOPED OPTICAL FIBER HAVING CORE CO-DOPED WITH FLUORINE

BACKGROUND OF THE INVENTION

1. Field of the Invention

This invention relates to optical fibers and, more particularly, to rare-earth-doped silica optical fibers for high power optical amplifier applications.

2. Discussion of the Related Art

Because of their high performance and cost effectiveness, rare-earth-doped fiber amplifiers (REDFAs), especially erbium-doped fiber amplifiers (EDFAs), are widely used in silica fiber-optic communication systems such as, for example, long-haul transport and CATV applications. Innovative design and optimization of rare-earth-doped fibers (REDFs), especially erbium-doped fibers (EDFs), have both played a critical role in these applications. In particular, designs that confine the optical mode field and control the erbium distribution enable efficient, low-noise amplification of C-band and L-band light at low and medium optical power levels. On the other hand, for high power applications large mode area fiber with low numeric aperture (NA) lowers the pump intensity, thereby reducing deleterious nonlinear effects and pump excited state absorption, which are discussed below. See, for example, P. F. Wysocki et aL, "Erbium-doped fiber amplifiers: advanced topics," *Rare-Earth-Doped Fiber Lasers and Amplifiers*, ed. M. J. Digonnet, p. 583 (2001). High performance EDFAs for high power WDM applications require EDFs with both large mode area and flat spectral shape. However, commercially available low NA EDF is typically not suitable for WDM applications because the gain spectrum is not sufficiently flat.

It is well known that EDF designs need to be separately optimized for each different amplifier application. Regardless of the design, however, high performance EDFs for WDM applications should possess certain fundamental characteristics: high power conversion efficiency at the requisite pump power level and relatively flat spectral gain shape over the wavelength range of operation; e.g., the range covered by the C-band (approximately 1525 nm to 1570 nm) and L-band (approximately 1570 nm to 1610 nm).

Consider, for example, conventional silica EDFs in which in the core is doped with aluminum (Al) and germanium (Ge) as well as erbium (Er). High Al concentration is necessary to achieve a relatively flat gain spectrum over the C-band and L-band. In addition, for high power applications, low NA is desirable for two reasons: first, it reduces deleterious nonlinear effects (e.g., four-wave mixing); and second, it reduces excited state absorption at 980 nm, thereby improving power conversion efficiency when using 980 nm pump light. Trying to achieve both of these characteristics in conventional EDFs presents the following conundrum: high Al concentration and low NA cannot be achieved simultaneously because Al increases the refractive index of the core, which increases the NA.

Thus, a need remains in the art for an REDF, especially an EDF, that has both a relatively flat gain spectrum and a low core NA, making the REDF suitable for high power REDFA applications.

BRIEF SUMMARY OF THE INVENTION

In accordance with one aspect of our invention, an REDF comprises a silica core region doped with at least one rare earth element and a cladding region adjacent the core region, characterized in that the core region is also doped with Al and fluorine (F). The presence of small amounts of F are effective to lower the refractive index, and hence the NA, of the core region even in the presence of significant amounts of Al (e.g., >8 mol %). Thus, our REDF has both a relatively flat gain spectrum and a low NA (e.g., preferably <0.20). Preferably the rare earth composition of the core of our REDF includes at least erbium, and the core is also doped with germanium.

In accordance with another aspect of our invention, an REDFA incorporates an REDF of the type described above.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

DETAILED DESCRIPTION OF THE INVENTION

General REDFA Structure

Figure 1:
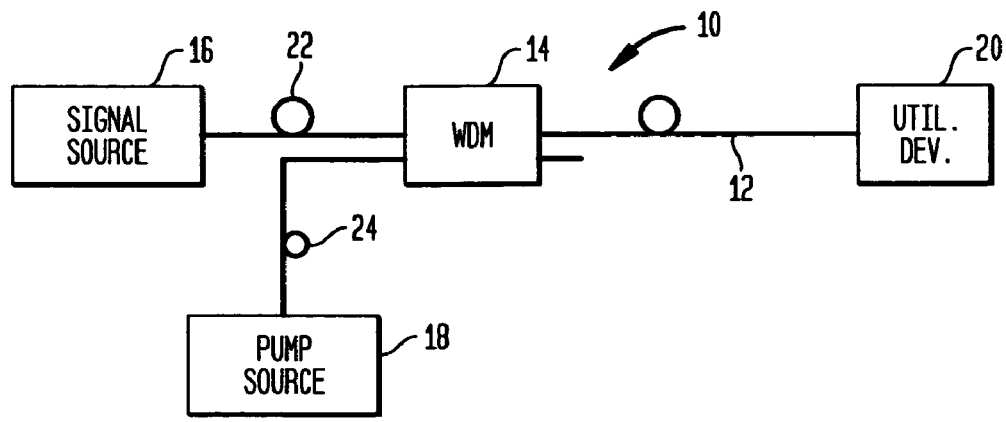
FIG. 1 is a schematic block diagram of a prior art REDFA.

A typical REDFA 10, as shown in FIG. 1, comprises an REDF 12, which optically couples a wavelength division multiplexer (WDM) 14 and a utilization device 20. The WDM 14 in turn couples the outputs of an input signal source 16 and a pump source 18 onto the REDF 12. The input signal source 16 generates a first-wavelength optical signal, which is coupled to an input of WDM 14 via a conventional fiber 22, whereas the pump source 18 generates a second-wavelength pump signal, which is coupled by a conventional fiber 24 to another input of WDM 14.

As is well known in the art, the pump signal generates a population inversion in the REDF 12, which amplifies the optical signal from input source 16. The amplified signal propagates along EDF 12 to utilization device 20. The latter may include a myriad of well known devices or apparatuses; e.g., another REDFA, an optical receiver, an optical modulator, an optical coupler or splitter, or a piece of terminal equipment. Each of these is typically coupled to the REDF 12 via a standard pigtail connector (not shown).

Illustratively, the input source 16 is an InP-based long wavelength laser that generates a relatively low power optical signal at wavelength in the C-band to L-band range (i.e., center wavelengths of approximately 1525 nm to 1610 nm), whereas the pump source 18 is either a GaAs-based short wavelength laser that generates a relatively high optical power (e.g., above about 150 mW) pump signal at a center wavelength of about 1000 nm (e.g., 980 nm) or is an InP-based longer wavelength laser that generates a similar power level pump signal at a center wavelength of about 1500 nm (e.g., 1480 nm).

Although the REDFA of FIG. 1 depicts a common co-propagating pump configuration (i.e., the pump and input signals propagate in the same direction through the REDF), it is also possible to use a counter-propagating configuration (i.e., the pump and input signals propagate in opposite directions through the REDF). In addition, a multiplicity of REDFAs may be arranged in tandem, a scheme that is well known in the art for providing gain over extended distances of certain long-haul transmission systems.

REDF Design

Figure 2A:
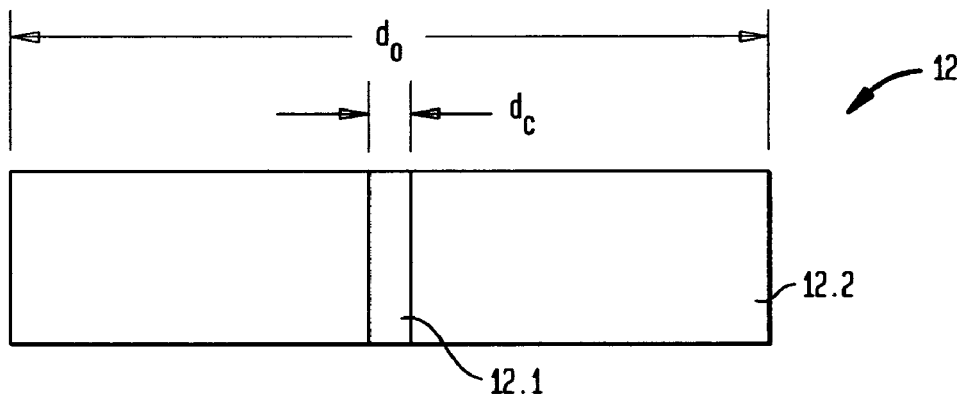
FIG. 2A is a schematic cross-sectional view of an REDF taken transverse to its axis of propagation, in accordance with one embodiment of our invention.
Figure 2B:
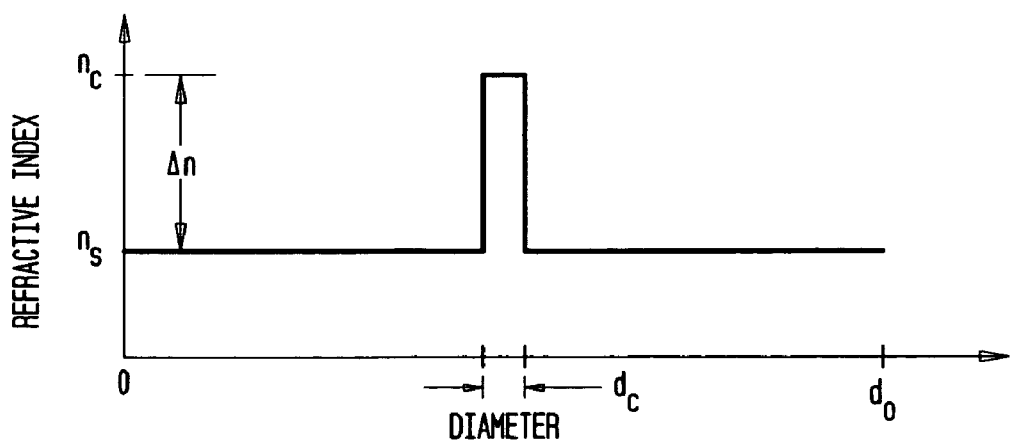
FIG. 2B is a schematic refractive index profile of the REDF shown in FIG. 2A.

In accordance with one aspect of our invention, as shown in FIGS. 2A–2B, the REDF 12 comprises a relatively high index ($n_c$) silica core region 12.1 doped with at least one rare earth element (e.g., erbium, ytterbium, thulium, neodymium, and/or praseodymium) and a lower index ($n_s$) cladding region 12.2 adjacent the core region, characterized in that the core region 12.1 is also doped with Al and F. The presence of small amounts of F are effective to lower the refractive index, and hence the NA, of the core region even in the presence of a significant amount of Al (e.g., >8 mol %). Thus, our REDF has both a relatively flat gain spectrum and a low NA (e.g., preferably <0.20).

Preferably the rare earth composition of the core of our REDF includes at least erbium, and the core is also doped with germanium.

In one embodiment, which simplifies manufacturing, the cladding region 12.2 is undoped silica. Alternatively, however, a portion of the cladding region (not shown), adjacent the core region, may be doped to create an inner cladding region and an outer cladding region, with the refractive index of the inner cladding region being intermediate that of the core region and the outer cladding region. In this regard, dopants such as Ge, Al and P, or any combination of them, can be used to increase the refractive index of silica, whereas dopants such a F can be used to decrease the refractive index of silica.

The preferred embodiment of our invention is an EDF of the type shown in FIGS. 2A–2B. Typical compositions and suitable ranges for the silica core dopants are given in Table I below:

TABLE I

| CORE DOPANT | COMPOSITION TYPICAL | COMPOSITION SUITABLE RANGE |
|---|---|---|
| Er | 150 ppm mole | 50–2000 ppm mole |
| Al | 13 mole % | 8–20 mole % |
| Ge | 0.5 mole % | 0.1–5 mole % |
| F | 1 mole % | 0.5–5 mole % |

Note, however, that Er, Al and Ge are typically present in the core in their oxide forms; i.e., $Al_2O_3$, $GeO_2$ and $Er_2O_3$, respectively.

In addition, the refractive index difference ($\Delta n$) between the core and cladding regions, numeric aperture (NA), cutoff wavelength ($\lambda_{co}$), core diameter ($d_c$), and cladding diameter ($d_o$) of our EDF of the type shown in FIGS. 2A–2B are given in Table II below:

TABLE II

| EDF PARAMETER | TYPICAL | SUITABLE RANGE |
|---|---|---|
| $\Delta n$ | 0.0105 | ≦0.014 |
| NA | 0.175 | <0.20 |
| $\lambda_{co}$ | 1140 nm | <1400 nm |
| $d_o$ | 125 μm | 60–130 μm |
| $d_c$ | 5 μm | 3–10 μm |

EXAMPLE

This example describes an EDF in accordance with an illustrative embodiment of our invention, which is designated FIBER-1. Comparisons are made to two other EDFs (designated FIBER-2 and FIBER-3) that did not contain F in their cores. FIBER-2 was designed primarily for operation at medium-level pump powers (e.g., about 100 mW), whereas FIBER-3 was designed primarily for operation at high-level pump powers (e.g., above about 150 mW). All three fibers were pumped using the output of a 980 nm GaAs-based diode laser.

Various materials, dimensions and operating conditions are provided by way of illustration only and, unless otherwise expressly stated, are not intended to limit the scope of the invention.

More specifically, all three EDF fibers were manufactured using a well know MCVD process to dope the core with a combination of Er, Ge, Al, and in the case of FIBER-1 the core was also doped with F (about 1 mole %). Various parameters of the three EDF fibers are shown in Table III, below:

TABLE III

| EDF PARAMETERS | FIBER-1 | FIBER-2 | FIBER-3 | UNITS |
|---|---|---|---|---|
| Peak absorp. ~ 1530 nm | 7.4 | 6.5 | 4.3 | dB/m |
| Pump peak absorp. ~ 980 nm | 4.0 | 4.7 | 3.4 | dB/m |
| Background loss at 1550 nm | 0.5 | 0.7 | 0.4 | dB/km |
| NA | 0.176 | 0.223 | 0.173 | |
| $\lambda_{co}$ | 1143 | 896 | 895 | nm |
| Mode field diameter at 1550 nm | 6.7 | 5.9 | 7.5 | μm |
| Core diameter ($d_c$) | 4.9 | 3.1 | 4.0 | μm |
| Al concentration | 13 | 11 | 6 | mole % |

Figure 3:
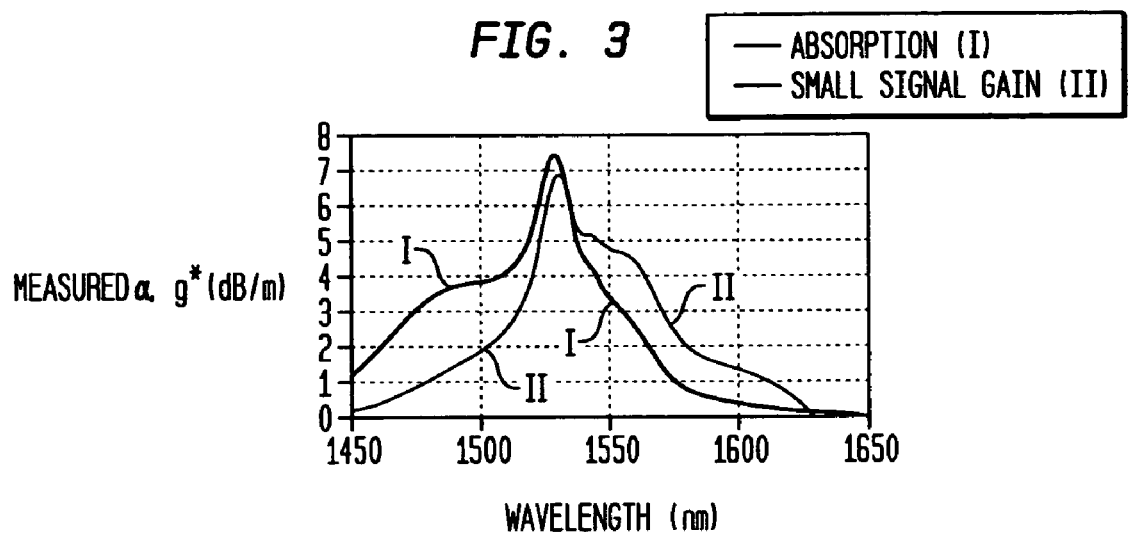
FIG. 3 is a graph of absorption and small signal gain of an EDF, in accordance with one embodiment of our invention.

The measured spectral absorption ($\alpha$; Curve I) and small signal gain ($g^*$; Curve II) for FIBER-1 are shown in FIG. 3.

Figure 4:
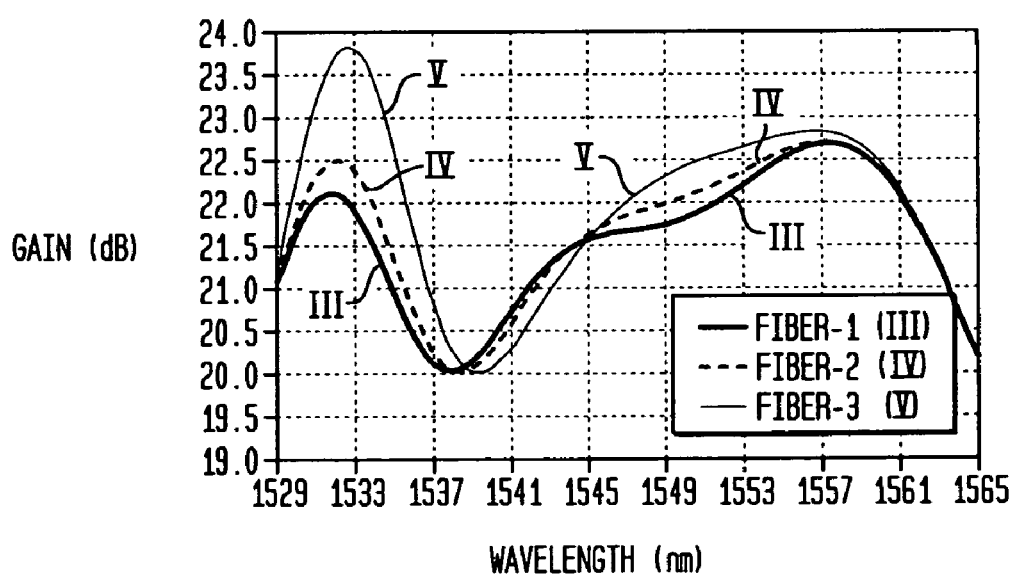
FIG. 4 is a graph of the gain spectra of an EDF, in accordance with one embodiment of our invention, compared to several prior art EDFs.

The gain spectra of all three fibers are compared in FIG. 4. The gain calculations were based on the following equations for gain (G) and gain ripple (R):

$$G(\lambda, Inv) = [g^*(\lambda)Inv - (1-Inv)\alpha(\lambda)]L \tag{1}$$

$$R = [G_{max}(\lambda) - G_{min}(\lambda)]/G_{min}(\lambda) \tag{2}$$

Where Inv is the average inversion level of Er ions, L is the length of the EDF fiber, $\alpha$ is the absorption, and $g^*$ is the small signal gain.

In the gain shape calculation, the gain at 1565 nm and the minimum gain at ~1538 nm were each made to be 20 dB by changing Inv and L. Therefore, the gain tilt was zero between these two points as a matter of convenience only. Importantly, FIG. 4 shows that the gain spectrum of the FIBER-1 (Curve III) is flatter than the gain spectrum of either the FIBER-2 (Curve IV) or the FIBER-3 (Curve V). The flatness is at least 1 dB better at the minimum gain of 20 dB than that of the FIBER-3, and slightly better than that of the FIBER-2, a fiber that is ideal for WDM applications at medium pump power levels (e.g., about 100 mW) but not at high pump power levels (e.g., above about 150 mW). The gain flatness is further illustrated by the ripple (R) data of Table IV.

TABLE IV

| Gain Flatness | FIBER-1 | FIBER-2 | FIBER-3 | UNITS |
|---|---|---|---|---|
| R | 13.3 | 13.5 | 19.2 | % |
| $\lambda_{pk}$ | 1531.8 | 1532.2 | 1532.8 | nm | where $\lambda_{pk}$ is the wavelength of the leftmost gain peak (around 1532 nm) in FIG. 4.

To further demonstrate the improved performance of FIBER-1, we measured its power conversion efficiency (PCE), which was compared to that of FIBER-2. PCE is defined as follow:

$$PCE=(P^s_{out}-P^s_{in})/P^p_{in} \quad (3)$$

where $P^s_{out}$ is the power of the amplified signal emerging from the EDF, $P^s_{in}$ is power of the signal to be amplified at the input end of the EDF, and $P^p_{in}$ is the power of the pump signal coupled into the EDF.

Figure 5:
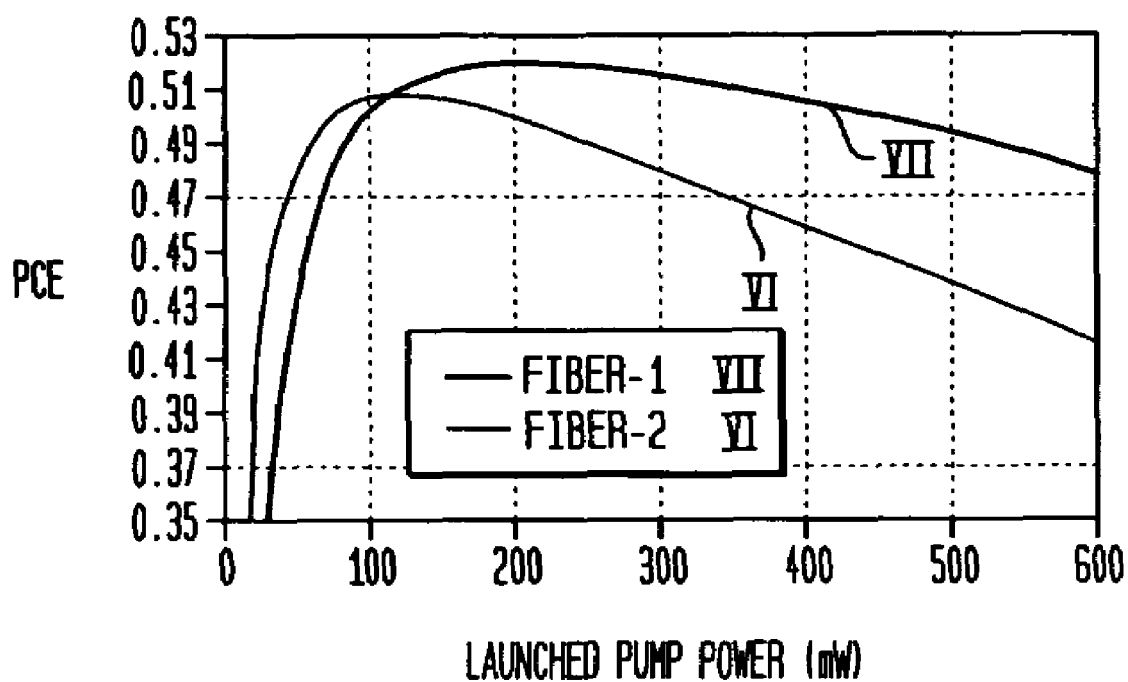
FIG. 5 is a graph of power conversion efficiency (PCE) of an EDF, in accordance with one embodiment of our invention, compared to a prior art EDF.

In the measurement we used a simple one-stage amplifier configuration with co-propagating pump of the type shown in FIG. 1. However, in order to obtain high 980 nm pump powers, two 980 nm pump lasers were multiplexed together to achieve pump powers of over 600 mW at ~978 nm. The input signal wavelength and power were 1550 nm and 0 dBm, respectively. FIG. 5 clearly demonstrates that the PCE of FIBER-1 (Curve VII) exceeds that of FIBER-2 for pump power levels above about 100 mW.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the performance of a fiber is strongly influenced by its cutoff wavelength because higher cutoff improves the overlap between Er ions and the optical mode field. Thus, the PCE difference between FIBER-1 and FIBER-2, as shown in FIG. 5, is mainly attributable to the Er ion concentration difference, which is brought about by the difference in their cutoff wavelengths—about 1100 nm for FIBER-1 but only about 900 nm for FIBER-2.

We claim:

1. An optical fiber comprising:
    a silica core region doped with at least one rare earth element,
    a cladding region adjacent said core region, characterized in that
    said core region is doped with erbium so as to amplify an optical signal propagating therein at a center wavelength in the approximate range of 1525 nm to 1610 nm in response to an optical pump signal applied thereto at a center wavelength of approximately 1000 nm or 1500 nm and at a power level of at least about 100 mW,
    the composition of said core region includes aluminum with a mole fraction of about 8–20 mole %, germanium with a mole fraction of about 0.1–5 mole %, and fluorine with a mole fraction of about 0.5–5 mole %, said core region composition producing a flatter gain spectrum within said wavelength range and a higher power conversion efficiency at pump powers above about 100 mW than fibers having different composition, and
    said core and cladding regions are configured so that said fiber has a numerical aperture of less than approximately 0.20.

2. An optical amplifier comprising:
    an optical fiber according to claim 1 for amplifying an optical signal propagating therein in response to pump energy applied thereto,
    a source of said pump energy, and
    a coupler for coupling said pump energy and said optical signal into said optical fiber.

3. The amplifier of claim 2, wherein said optical signal has a first center wavelength and said source of pump energy comprises a laser for generating an optical pump signal having a second center wavelength.

4. The amplifier of claim 3, wherein said source of pump energy comprises a diode laser for generating said optical pump signal at a center wavelength of about 980 nm.

5. A high power optical amplifier comprising:
    a single mode silica optical fiber having a core region and a cladding region surrounding said core region,
    said core region being doped with erbium so as to amplify an optical signal propagating therein at a center wavelength in the approximate range of 1525 nm to 1610 nm in response to an optical pump signal applied thereto,
    a diode laser for generating said pump signal at a center wavelength of approximately 980 nm or 1480 nm and at a power level of at least about 100 mW,
    a wavelength division multiplexer for coupling said pump signal into said core region, characterized in that
    the composition of said core region includes aluminum with a mole fraction of about 8–20 mole %, germanium with a mole fraction of about 0.1–5 mole %, and fluorine with a mole fraction of about 0.5–5 mole %, and said core region has a numerical aperture of less than approximately 0.20, said core region composition producing a flatter gain spectrum within said wavelength range and a higher power conversion efficiency at pump powers above about 100 mW than fibers having different compositions.

* * * * *